United States Patent [19]

Furukawa

[11] Patent Number: 5,322,527
[45] Date of Patent: Jun. 21, 1994

[54] METHOD OF MANUFACTURING SEALED-TYPE STORAGE BATTERIES USING HYDROGEN-OCCLUSION ELECTRODES

[75] Inventor: Jun Furukawa, Iwaki, Japan

[73] Assignee: Furukawa Denchi Kabushiki Kaisha, Kanagawa, Japan

[21] Appl. No.: 64,866

[22] Filed: May 24, 1993

[30] Foreign Application Priority Data

Jun. 9, 1992 [JP] Japan .................................. 4-174814

[51] Int. Cl.$^5$ ......................... H01M 6/00; H01M 4/58
[52] U.S. Cl. .................................. 29/623.5; 29/623.1; 429/223
[58] Field of Search ................. 29/623.5, 623.2, 623.1; 429/223

[56] References Cited

U.S. PATENT DOCUMENTS 5,077,149 12/1991 Ikoma et al. ........................ 29/623.5

FOREIGN PATENT DOCUMENTS 609149 5/1978 U.S.S.R. ............................. 29/623.5

Primary Examiner—John S. Maples
Attorney, Agent, or Firm—Breiner & Breiner

[57] ABSTRACT

A method of manufacturing a sealed-type storage battery using a hydrogen-occlusion electrode and an alloy for making the electrode is described. The sealed-type storage battery uses the hydrogen-occlusion electrode as a negative electrode. The battery is filled up with an alkaline electrolyte and is then allowed to stand for not more than 14 hours prior to the commencement of the initial charging of the battery. The initial charging is discontinued for at least one hour when the battery is in an incomplete charged state, i.e., when the battery is charged 5% or more but less than 100% of its rated capacity. Thereafter, the charging of the battery is continued until the battery is charged to its full capacity. The invention provides a sealed-type storage battery which has a low internal pressure during an overcharging operation, has a small capacity loss when operated whether at a high or low temperature, and has a longer cycle life as compared to conventional batteries.

7 Claims, 10 Drawing Sheets

$a+b+c+d(=5/\alpha)$ $SLm \alpha(Ni_{3.63} Co_{0.85} Al_{0.50} Si_{0.02})_5$

COMPOUNDING RATIO, BASED ON SLm, OF (a+b+c+d)

METHOD OF MANUFACTURING SEALED-TYPE STORAGE BATTERIES USING HYDROGEN-OCCLUSION ELECTRODES

FIELD OF INVENTION

The invention relates to a method of manufacturing a sealed-type storage battery using a hydrogen-occlusion electrode and a hydrogen-occlusion alloy for making the electrode.

BACKGROUND OF INVENTION

A sealed-type alkaline storage battery is known in the art which includes a negative hydrogen-occlusion electrode made of a hydrogen-occlusion alloy capable of reversibly occluding and releasing hydrogen. The battery additionally includes a positive electrode made of nickel oxide or the like stacked in relation to the negative electrode in a laminate fashion with a separator interposed between the two electrodes. This electrode assembly is then placed in a container followed by the pouring of an alkaline electrolyte into the container and attachment of a cover to the container in a manner to hermetically seal the container. Since this type of sealed storage battery is pollution-free and has a high energy density, it has recently attracted attention as possibly replacing conventional nickel-cadmium storage batteries.

A hydrogen-occlusion electrode is considered advantageous in that, while allowing for the construction of a storage battery in the same manner as when a conventional cadmium electrode is used, a hydrogen occlusion electrode provides a greater energy density of actual usable discharge capacity. Hydrogen-occlusion alloys, such as $LaNi_{4.5}Al_{0.5}$, $LaNi_{4.0}Co_{0.5}Al_{0.5}$, or the like, are suitable for making a hydrogen-occlusion electrode.

However, when utilizing a conventional method of manufacturing a sealed-type storage battery using a hydrogen-occlusion electrode, it has been found that when an electrolyte is poured into the container holding the electrodes and charging is carried out, that the metal content present in the hydrogen-occlusion electrode becomes eluted in the electrolyte. This is especially the case when the hydrogen-occlusion electrode is made of a hydrogen-occlusion alloy containing cobalt (Co) as one of the metal elements. The elution of the electrode by the electrolyte results in a change in the composition of the alloy and causes an oxide of the metal to form a film on the surface of the alloy. As a result, the internal pressure of the battery rises to the extent that the battery's safety valve is actuated to release the excess pressure of the gas whereupon the electrolyte is also partially released with the gas resulting in loss of the electrolyte and a shorter life for the battery. Additionally, following assembly of the battery, it is not possible to charge the battery uniformly since the electrodes are not uniformly impregnated with the electrolyte. A storage battery manufactured using a conventional manufacturing process, therefore, is subject to the disadvantages of having a comparatively smaller capacity, a shorter cycle life, a greater capacity loss under a high- or low-temperature condition, and a higher internal pressure at the time of an overcharge operation.

OBJECTS AND BRIEF DESCRIPTION OF THE INVENTION

A primary object of the present invention is to provide a method of manufacturing a sealed-type storage battery using a hydrogen-occlusion electrode which eliminates the above-described disadvantages of a storage battery manufactured by a conventional method.

The method of the present invention is characterized in that (1) there is provided a standing time of not more than about 14 hours between when a sealed-type storage battery equipped with a hydrogen-occlusion electrode is filled with an alkaline electrolyte up to the commencement of the initial charging of the battery, and (2) the initial charging of the battery is discontinued for at least one hour when the storage battery has become charged to 5% or more but less than 100% of its rated capacity, and thereafter the charging of the battery is resumed.

While the mechanism of the present invention is yet to be fully clarified, it is believed that when the initial charging is commenced within 14 hours after the storage battery is filled with an alkaline electrolyte, that elution into the electrolyte of a metal content, such as Co, of the hydrogen-occlusion alloy from which the negative electrode is made, is effectively checked or prevented and, therefore, the formation of a metal oxide film on the surface of the alloy is prevented. Thus, a high surface activity for the alloy is maintained and any oxygen generated from the positive electrode can be rapidly reduced so as to prevent the internal pressure of the battery from rising.

In the present invention, it is preferable to maintain the internal pressure of the battery at a level not exceeding 20 Kilogram-force per square centimeter ($Kgf/cm^2$) which is below the actuation pressure of the safety valve provided in the battery. The maximum allowable standing time between when the battery has been filled up with an electrolyte and the start of the initial charging of the battery is about 14 hours if the internal pressure of the battery is to be maintained within the desired level. Preferably, the standing time is about 10 hours or less after filling the battery with an alkaline electrolyte. It is most preferable to start the initial charging of the battery within about 5 hours of the filling of the battery with the electrolyte so that the internal pressure of the battery can be kept to half the described level or even lower.

The charging of the battery, following standing of the battery as described above, is discontinued for at least one hour when the battery has become charged 5% or more but less than 100% of its rated capacity. This temporary discontinuance of charging allows for sufficient permeation and diffusion of the electrolyte into the electrode while enabling the internal pressure of the battery to be kept at 20 $Kgf/cm^2$ or lower, even during overcharging. Preferably, the break or discontinuance during charging is about 5 hours or more and, most preferably, 20 hours or more so that the internal pressure of the battery can be lowered even further. Additionally, it is preferable to discontinue the initial charging when the battery has become charged to at least about 20% of its rated capacity to thereby reduce the internal pressure of the battery to the lowest level.

In one embodiment of the method of manufacturing a sealed-type storage battery of the present invention, it is preferable that the hydrogen-occlusion alloy used to make the hydrogen-occlusion electrode of the battery has a composition expressed by the formula $SLmNi_aCo_bAl_cM_d$ wherein $SLm$ represents a mixture of lanthanum (La), neodymium (Nd) and at least one other rare earth element; and M represents at least one element selected from silicon (Si) or germanium (Ge). SLm comprises at least 70 wt. % of La and 20 wt. % or less of Nd; and a, b, c and d are as follows: $3.0 \leq a \leq 3.8$, $0.6 \leq b < 1.4$, $0.3 \leq c \leq 0.7$ and d is $0.01 \leq d \leq 0.05$ when M is Si or d is $0.01 \leq d \leq 0.3$ when M is Ge.

When the La content in the SLm component is 70 wt. % or more and the Nd content is 20 wt. % or less various advantages are achieved including (1) an electrochemically occluded amount of hydrogen in the electrode at a battery temperature of 60° C. is maintained at a desirable level of 200 milliampere per hour (mA/h) or higher, (2) the battery life in terms of charge-discharge cycles is at the desired 500 cycles or more, and (3) a 60% or higher capacity retention rate is secured in a rapid discharge operation at low temperatures.

It has been found that the nickel and cobalt contents of the hydrogen-occlusion alloy affect the capacity retention rate of the battery in a rapid discharge operation at low temperatures, the internal pressure of the battery during overcharging, and the battery life in terms of charge-discharge cycles. When the Ni content is kept in the range of $3.0 \leq a \leq 3.8$ and the Co content in the range of $0.6 \leq b < 1.4$, a 60% or higher capacity retention rate in the discharge operation at 0° C. can be obtained and the internal pressure of the battery can be maintained at 20 Kgf/cm$^2$ or lower while assuring a battery life of 500 cycles or more.

The aluminium (Al) content of the alloy has also been found to affect the capacity retention rate in the rapid discharge operation and the battery life in terms of the charge-discharge cycles. When the Al content is kept in a range of $0.3 \leq c \leq 0.7$, a battery life of 500 cycles or more and a capacity retention rate of 60% or higher is obtained.

The component M of the alloy, which is Si, Ge, or a mixture thereof, also affects the rapid discharge capacity retention at room temperature or higher, the battery life in terms of charge-discharge cycles, and the internal pressure of the battery. When the Si content is maintained in the range of $0.01 \leq d \leq 0.05$ or the Ge content in the range of $0.01 \leq d \leq 0.3$, a 90% or higher capacity retention rate in a high-temperature rapid discharge operation is maintained as well as a battery life of 500 cycles or more secured in terms of normal or room temperature charge-discharge cycles, and the internal pressure of the battery maintained at or below 20 Kgf/cm$^2$.

The atomic compounding ratio is based on the SLm component of the alloy and, therefore, in determining the compounding ratio, the value of SLm is taken as 1. The sum total of Ni, Co, Al and M, i.e., $a+b+c+d$, is expressed as a ratio per atom gram of SLm. When the SLm-based ratio is maintained in the range of $4.5 \leq a+b+c+d \leq 5.1$, the internal pressure of the battery can be held down to 20 Kgf/cm$^2$ or lower and a battery life of 500 cycles or more obtained.

DETAILED DESCRIPTION OF PRESENTLY PREFERRED EMBODIMENTS

Figure 1:
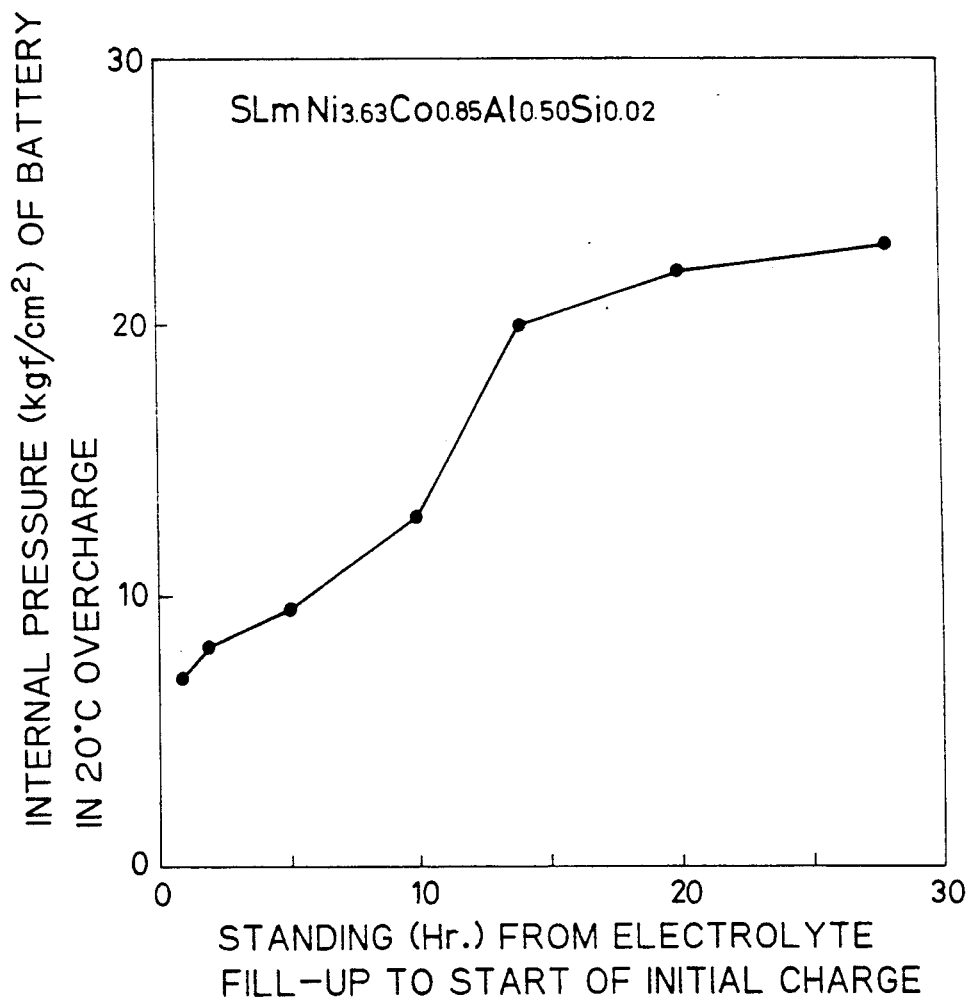
FIG. 1 is a graph representing the relationship between the standing time from electrolyte filling of the battery to the commencement of the initial charging and the internal pressure of the battery during overcharging at 20° C. The curve of the graph depicts one aspect of the method of manufacturing a sealed-type storage battery according to the present invention.

Embodiments of a method of manufacturing a sealed-type storage battery equipped with a hydrogen-occlusion electrode comprising a hydrogen-occlusion alloy according to the present invention are described in further detail through preferred specific examples. In the examples, the storage batteries are prepared as described below.

A hydrogen occlusion electrode is made using a hydrogen-occlusion alloy containing at least Co as one of its metal components by a conventionally known method. This electrode is used as a negative electrode in a stacked laminate relationship with a positive electrode manufactured according to a conventionally known method and a separator which is interposed between the two electrodes to provide a storage battery element. The battery element can be rolled up or maintained flat and is inserted into a suitably shaped battery container. After the battery element is inserted into the battery container, an alkaline electrolyte is placed into the container and a cover securely attached thereto in such a manner as to hermetically seal the container and provide a sealed-type alkaline storage battery.

The term "standing time" as utilized below in describing the invention refers to the time between the filling of the battery container with an electrolyte and the commencement of the initial charging of the battery. "Standing time" can also alternatively be referred to as "waiting time". This "standing time" is an essential element of the manufacturing process according to the present invention.

The time at which the initial charging of the battery is discontinued is essentially any point in time when the battery has not become charged to 100% of its rated capacity. Preferably, however, the battery is charged to at least 5% of capacity and, most preferably, to 20% of its capacity as described above. For example, when the storage battery has a battery voltage of 0 to $-0.4$ volts (V) when filled with the electrolyte, the initial charging can be discontinued when the battery shows a charge of 0.2 V per cell or higher, preferably 1.2 V.

In the above described method of manufacturing a sealed-type storage battery, it is preferable to select for use a hydrogen-occlusion alloy wherein the SLm component of the hydrogen-occlusion alloy is a misch metal (Mm) or a misch metal combined with at least three kinds of rare earth elements whose compounding ratio can be determined as appropriate. A "misch metal" as used herein refers to a mixed rare earth metal prepared by electrolysis of fused rare earth chlorides. A preferred SLm component is one consisting primarily of a low-grade misch metal containing a lesser amount of La in which the amount of La can be adjusted as desired by adding more La. In either case, an SLm component prepared as described above costs much less as compared to using La alone.

The following examples illustrate the present invention by means of specific embodiments. The examples additionally illustrate the advantages obtained by using the method of manufacturing a battery containing a hydrogen-occlusion alloy according to the present invention. Such examples are not intended to limit the scope of the invention.

EXAMPLE 1

In Example 1, a commercially available misch metal including 85 wt. % La, 2 wt. % Co, 9 wt. % Nd and 4 wt. % of other rare earth elements was utilized as the SLm component. SLm, Ni, Co, Al and Si were each weighed and mixed together so as to provide a mixture having the compounding ratio of SLm $Ni_{3.63}Co_{0.85}Al_{0.50}Si_{0.02}$. The mixture was heated and melted in a high-frequency melting furnace to produce an alloy. An annealing treatment lasting for 10 hours at a temperature of 1000° C. was then applied to the alloy. Next, the alloy was mechanically pulverized to obtain a fine powder of the hydrogen-occlusion alloy of 150 mesh or less. Added to and mixed with the hydrogen-occlusion alloy powder were 15 wt. % of a powdered nickel carbonyl as sold under the tradename INCO #210 which serves as an electro-conductive agent and 3 wt. % of a powdered polyvinylidene fluoride which serves as a bonding agent. Thereafter, a 1%-concentration aqueous solution of carboxymethyl cellulose was added to the mixture. The mixture was then kneaded to form a slurry-like material. The slurry-like material was applied to a porous substrate or base plate and dried. The resulting pasted substrate was then roll-pressed to a predetermined thickness and baked at a temperature of 200° C. in a nitrogen atmosphere for 30 minutes so that the bonding agent became melted and bonded, thereby producing a hydrogen-occlusion electrode.

The hydrogen-occlusion electrode produced was then used as the negative electrode in a stacked laminate relationship with a paste-type nickel oxide positive electrode and a nylon separator interposed between the electrodes. The laminate was rolled up to form a storage battery element. The paste-type nickel oxide positive electrode used was a known electrode produced by applying to a foam nickel substrate a paste including a nickel hydroxide powder, a nickel carbonyl powder sold under the tradename INCO #255, and a cobalt powder. The pasted substrate was then dried and pressed. The battery element was placed into a battery container.

An alkaline electrolyte solution was prepared containing mainly potassium hydroxide and a small amount each of sodium hydroxide and lithium hydroxide. The electrolyte solution had a specific gravity of 1.30 g/cc at 20° C. The electrolyte solution was poured into the battery container and a cover was attached thereto by conventional means so as to seal the container hermetically.

A number of cylindrical sealed-type AA-Size 1000 milliampere-hour (mAh) storage batteries were manufactured according to this method. All of the storage batteries manufactured as above described for use in the tests described in Example 1 herein included an internal pressure-measuring sensor device to measure the internal pressure of the battery.

Using the prepared batteries, tests were conducted as described below to determine (a) how much the internal pressure of the battery at the time of overcharge would be influenced by the standing time between the time of electrolyte fill-up of the battery and the start of the initial charging of the battery; (b) how much the internal pressure of the battery at the time of overcharge would be influenced by the discontinuance or break time provided during the initial charge period; and (c) how much the internal pressure of the battery would be influenced by the amount of charged ampere-hours, i.e., the percentage of rated capacity to which the battery is charged, prior to the temporary discontinuance or break in charging.

With respect to (a) above, each of the plurality of the storage batteries prepared as described above were allowed a different standing time, namely, one of 2, 5, 10, 14, 20, and 28 hours.

Thereafter, an initial charge with a 0.2 Coulomb (C) current, i.e., 200 milliampere (mA), was applied to each of the batteries at 25° C. until the charged electrical quantity, i.e., a charged ampere-hour (Ah), amounted to 20% (200 mAh) of the battery's rated capacity. At that time, the initial charging was temporarily discontinued. After a discontinuance of charging for 10 hours, the initial charging was resumed and continued until the total charged electrical quantity amounted to 150% (1500 mAh) of the rated capacity of the battery, thus completing the charge to a final voltage of 1.45 V. The battery was then kept standing for one hour and, thereafter, the battery was discharged with 0.2 C (200 mA) current at 25° C. until the battery voltage came to 1.0 V. Next, the battery was charged with 0.2 C current for 150% of its rated capacity and, thereafter, discharged with the same current to the battery voltage of 1.0 V. For the purpose of activation, the battery was thereafter allowed to stand at 40° C. for 24 hours. A capacity confirmation test was then conducted wherein the battery was charged again with 0.2 C current for 150% of the rated capacity and discharged with the same current to the battery voltage of 1.0 V to confirm that all the batteries satisfied the rated capacity. Next, the internal pressure (Kgf/cm$^2$) of the charged batteries during an overcharge operation at 20° C. was measured. After the batteries were allowed to stand in a constant temperature water bath for 24 hours, each battery was charged with 1 C (1000 mAh) current for 450% (4500 mAh) of the rated capacity, and the internal pressure of each battery with 450% of charged ampere-hour was measured. The results thereof are as shown in FIG. 1.

As clear from FIG. 1, when the standing time was 14 hours or less, the internal pressure of the battery during an overcharge operation at 20° C. was held down to 20 Kgf/cm$^2$ or lower. The internal pressure can be further lowered to approximately 10 Kgf/cm$^2$, which is more preferable, when the initial charging is started within 10 hours or within 5 hours after filling the battery with the electrolyte.

With respect to (b) and (c) above, a plurality of batteries prepared as described above were all given the same standing time of 5 hours. The initial charging of the batteries was discontinued, respectively, when the charged electrical quantity of the batteries amounted to 5% of the rated capacity, 20% of the rated capacity, 50% of the rated capacity, and 100% of the rated capacity. The discontinuance or break time of the initial charging was varied among the batteries, namely, 5, 10, 15, 20, and 25 hours. Following each break time in charging, the initial charging was resumed for each battery and was considered complete when the charged electrical quantity amounted to 150% (1500 mAh). For comparison purposes, storage batteries were also charged using a conventional continuous charging with no break time.

The internal pressure of each battery during an overcharge operation at 20° C. was then measured in the same manner as described above. The results are shown in FIG. 2.

Figure 2:
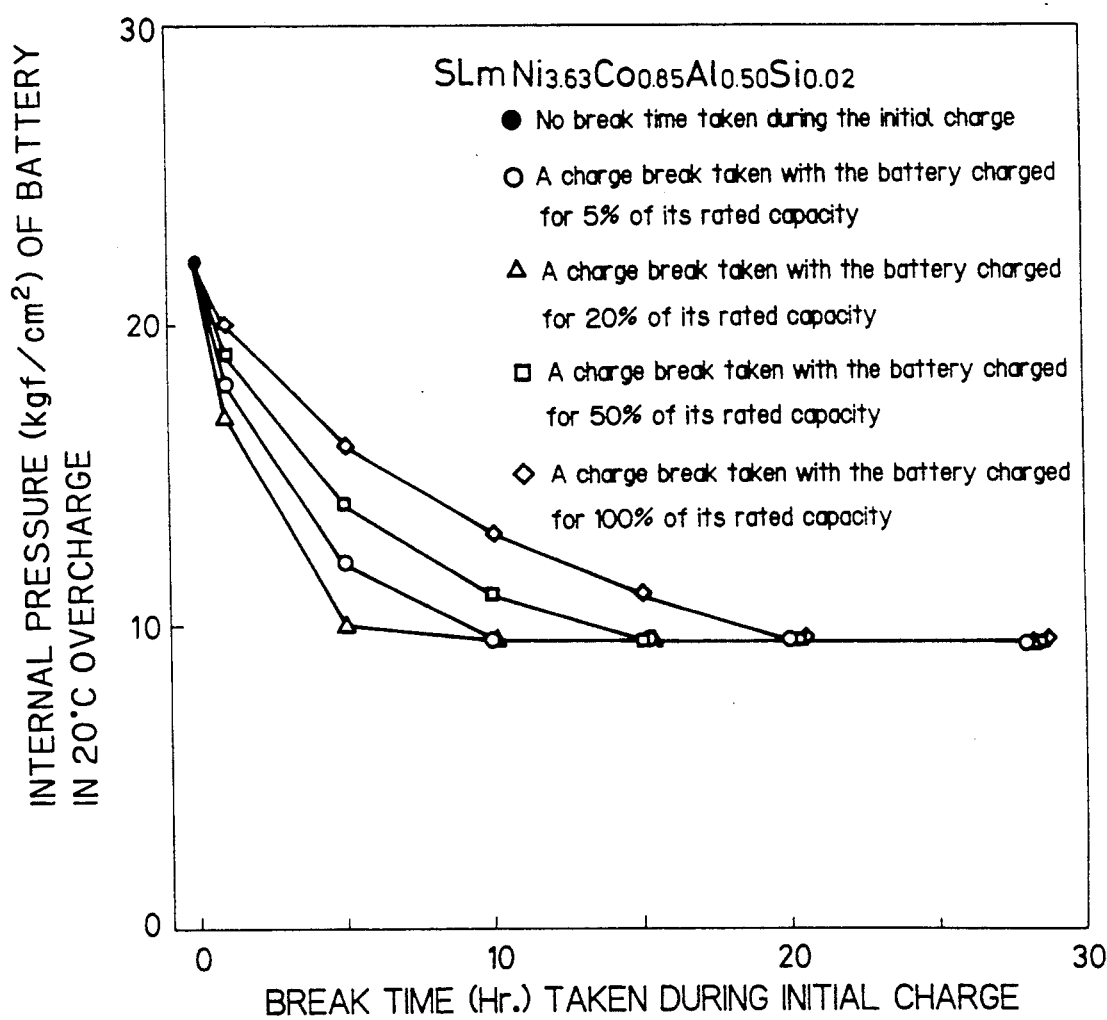
FIG. 2 is a graph representing the relationship between the break in time of the initial charging and the internal pressure of the battery during overcharging at 20° C. The graph of FIG. 2 depicts another aspect of the method of manufacturing a sealed-type storage battery according to the present invention.

As clear from FIG. 2, when the initial charge break time for batteries charged 5% or more but less than 100% of the rated capacity lasted for at least one hour or more, the internal pressure of the battery was held down to 20 Kgf/cm$^2$ or lower in an overcharge at 20° C.

Further it has been shown from the above that the internal pressure of the battery is the lowest when the break in the initial charging was when the battery was charged to 20% of its rated capacity. This indicates the optimum practice and that the break time in charging lasting for 5 hours or more is more desirable and that a break time of 20 hours is most desirable since the internal pressure can be held down to a very low level of 10 Kgf/cm$^2$ at any stage of the incompletely charged battery, i.e., the charged electrical quantity is in the range of from 5% or more of the rated capacity but less than 100% thereof.

EXAMPLE 2

Several types of hydrogen-occlusion alloys were manufactured using various SLm components. Various rare earth elements were combined with a commercially available Mm as a main component, such as La, Nd, cerium (Ce) and praseodymium (Pr), in the different compounding ratios shown in Table 1 below to prepare the different alloys as further described below.

TABLE 1

| TYPE OF SLm - No. | | 1 | 2 | 3 | 4 | 5 | 6 | 7 | 8 | 9 | 10 |
|---|---|---|---|---|---|---|---|---|---|---|---|
| EACH | La | 25 | 45 | 70 | 75 | *75 | 85 | 95 | 99 | *70 | **75 |
| COMPONENT | Nd | 18 | 35 | 20 | 15 | 7 | 4 | 1 | trace | 26 | 23 |
| IN SLm | Ce | 50 | 2 | 2 | 2 | 15 | 2 | 2 | trace | 2 | 1 |
| (Wt. %) | Pr | 7 | 18 | 8 | 8 | 3 | 9 | 2 | trace | 2 | 1 |

Figure 3:
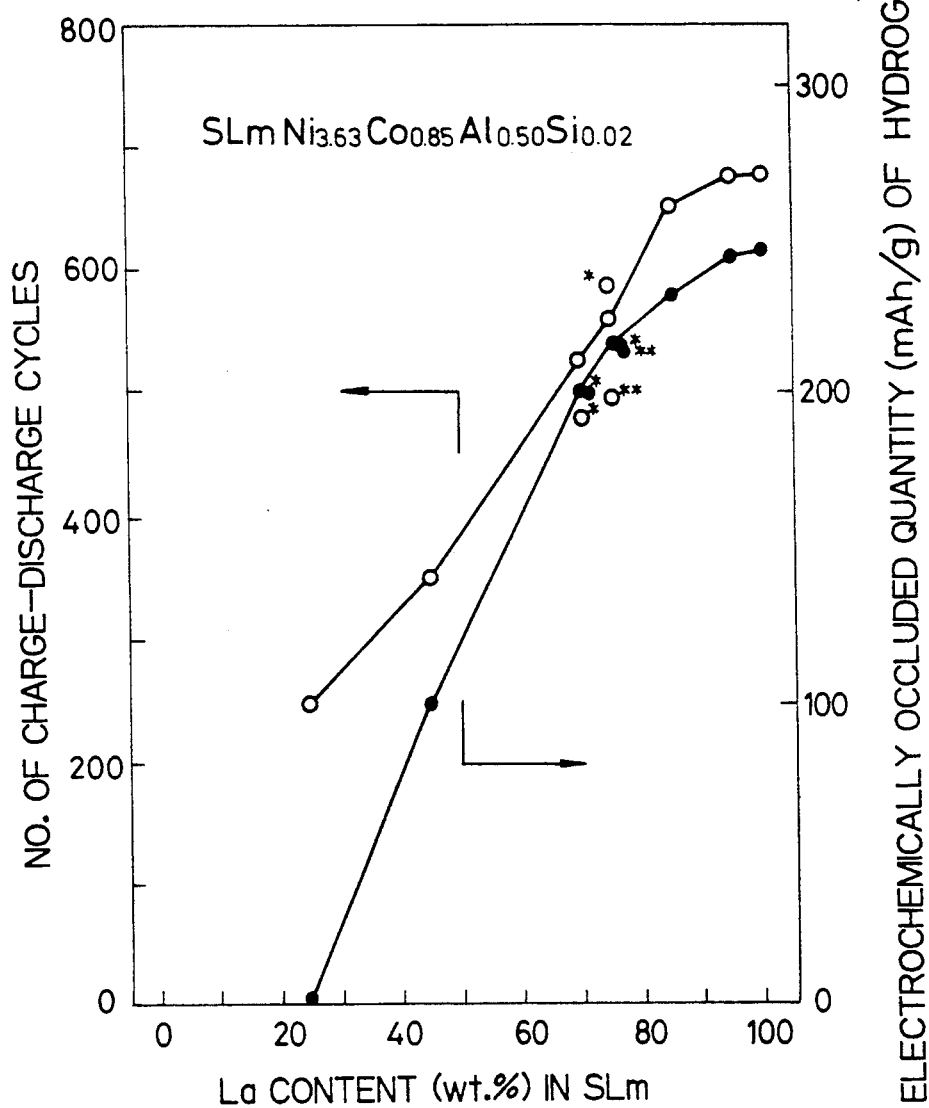
FIG. 3 is a graph representing the relationship between the La content in the SLm component of the hydrogen-occlusion alloy for the electrode and the number of charge-discharge cycles, and the relationship between the La content and the quantity of hydrogen electrochemically occluded at 60° C.

The asterisks in Table 1 above correspond to the asterisks contained in FIG. 3.

In forming hydrogen occlusion alloys, each of the SLm components set forth in Table 1, and Ni, Co, Al and Si were weighed and mixed together in a compounding ratio of SLm $Ni_{3.63}Co_{0.85}Al_{0.50}Si_{0.02}$. The mixtures were then heated and melted in a high-frequency melting furnace to produce an alloy. Each alloy obtained was annealed at a temperature of 1000° C. for 10 hours. In this manner, the respective alloys were produced. The alloys were pulverized into a powder form and processed to form an electrode in the same manner as described in Example 1 above. The electrode was then assembled with a positive electrode and separator in the same manner as set forth in Example 1 to produce cylindrical sealed-type AA-Size 1000 mAh storage batteries. None of the batteries prepared for use in Example 2 were equipped with a built-in internal pressure-measuring sensor device.

The standing time allowed for the batteries was 5 hours. The charging of the batteries was discontinued when the charged electrical quantity amounted to 20% of the rated capacity. The break in charging was for 15 hours, after which the initial charging was resumed until the battery became fully charged. Other procedures utilized up to and including the capacity confirmation test were the same as set forth in Example 1.

In order to conduct a cycle life test on the batteries, the batteries were charged with 1 C current while controlling the charged ampere-hour by a variable voltage (ΔAV) control system. After completion of the charge, the batteries were discharged with 1 C current to a battery voltage of 1.0 V. The battery life was considered as finished when the capacity of the battery had dropped to 60% of its rated capacity. Under these conditions, the cycle life of a battery should be desirably 500 cycles or more. The test results are shown in FIG. 3.

As clear from FIG. 3 and Table 1, when a hydrogen-occlusion electrode made of a hydrogen-occlusion alloy comprising a La content of SLm accounting for 70 wt. % or more and a Nd content of 20 wt. % or less is used, the battery life in terms of charge-discharge cycles is 500 cycles or more.

In order to measure how much hydrogen the above-described respective hydrogen-occlusion alloys can electrochemically occlude in a constant-temperature condition, the alloys were first processed as described below to manufacture hydrogen-occlusion electrodes. The alloys were mechanically pulverized to a particle size of 150 mesh or finer and mixed with 3 wt. % of polytetrafluoroethylene (PTFE) powder and 15 wt. % of a nickel carbonyl powder sold under the tradename INCO #210. After allowing the PTFE to become sufficiently fibriform, ethyl alcohol was added to the mixture to make it slurry-like. The slurry-like material was applied to a foam nickel substrate and the substrate dried and pressed to provide a hydrogen-occlusion electrode. The electrode contained approximately one gram of the hydrogen-occlusion alloy.

An open-type cell was made using the above electrode as the negative electrode, a nickel plate as a positive electrode and an aqueous solution of potassium hydroxide having a specific gravity of 1.30 g/cc at 20° C. as the electrolyte. A burette for collecting hydrogen gas was positioned over the hydrogen-occlusion electrode. The cell was placed in a constant temperature water bath of 60° C. and then the cell's hydrogen-occlusion electrode was charged with a current of 70 mA per gram of alloy. The quantity of hydrogen which was electrochemically occluded by the hydrogen-occlusion alloy contained in the electrode was determined from the quantity of electricity required to charge the cell and the amount of hydrogen collected by the hydrogen gas-collecting burette. The occluded quantity of hydrogen determined under these conditions should be 200 mAh/g-alloy or greater to be desirable from a battery designing point of view. FIG. 3 shows the results of the described test.

As clear from FIG. 3 and Table 1, when the La content of SLm accounted for 70 wt. % or more and the Nd content for 20 wt. % or less, the quantity of hydrogen occluded at the high temperature of 60° C. is 200 mAh/g-alloy or greater. Accordingly, a storage battery equipped with an electrode featuring a high hydrogen-occlusion characteristic can be obtained by using a hydrogen-occlusion alloy according to the invention.

EXAMPLE 3

A commercially available misch metal including 85 wt. % La, 2 wt. % Ce, 9 wt. % Nd, and 4 wt. % of other rare earth elements served as the SLm component and was mixed together with Ni, Co, Al and Si in a predetermined compounding ratio of SLm Ni$_a$Co$_b$Al$_{0.50}$Si$_{0.02}$ wherein a=4.38-b, and b=0.50, 0.60, 0.75, 0.85, 1.00, 1.20, 1.38 and 1.48, i.e., a=3.88, 3.78, 3.63, 3.53, 3.38, 3.18, 3.00 and 2.90 respectively. The respective mixtures were heated and melted in a high-frequency melting furnace to manufacture the respective hydrogen-occlusion alloys. Each of these alloys was then annealed at 1000° C. for 10 hours, after which each alloy was mechanically pulverized into a fine powder of 150 mesh of finer to obtain a hydrogen-occlusion alloy powder.

Hydrogen-occlusion electrodes were manufactured using the prepared hydrogen-occlusion alloys in the same manner as described in Example 1. Using the electrodes as negative electrodes, a plurality of cylindrical sealed-type AA-Size, 1000 mAh storage batteries were produced in the same manner as described in Example 1. In order to measure the internal pressure of the batteries during an overcharge operation at 20° C., each of the batteries was equipped with an internal pressure-measuring sensor device.

Each of the batteries was subjected to a standing time of 5 hours after which the initial charging of the batteries was started. The charging was discontinued when the charged electrical quantity amounted to 20% of the rated capacity of the battery. The break time in charging was 5 hours. The resumption of the charging and the other procedures that followed to the completion of the charge were the same as described in Example 1.

A test to measure the internal pressure of the battery during an overcharge operation at 20° C. was then made on each of the storage batteries prepared. The test was conducted in the same manner as described in Example 1. The internal pressure of the batteries measured should be 20 Kgf/cm$^2$ or lower to be desirable. The results of the tests are shown in FIG. 4.

As clear from FIG. 4, when the Ni content is in the range of $3.0 \leq a \leq 3.8$ and the Co content in the range of $0.6 \leq b < 1.4$, both based on SLm being taken as 1, the internal pressure of the battery was maintained at or below 20 Kgf/cm$^2$.

Further, the test batteries were charged with 0.2 C current at 20° C. for 150% of their rated capacity, after which the batteries were kept at 0° C. for 12 hours. Thereafter, the batteries were discharged with 1.5 C current at the same temperature of 0° C. until the battery voltage was 1.0 V in order to measure the discharge capacity. The capacity retention rate based on the 0° C. rapid discharge test conducted as described was obtained by dividing the discharge capacity obtained in the present test by that determined for the same battery through the capacity confirmation test described above wherein the battery was discharged with 0.2 C current at 20° C. It is considered desirable if the capacity retention rate determined through the 0° C. rapid discharge test is 60% or higher. The test results are shown in FIG. 4.

Figure 4:
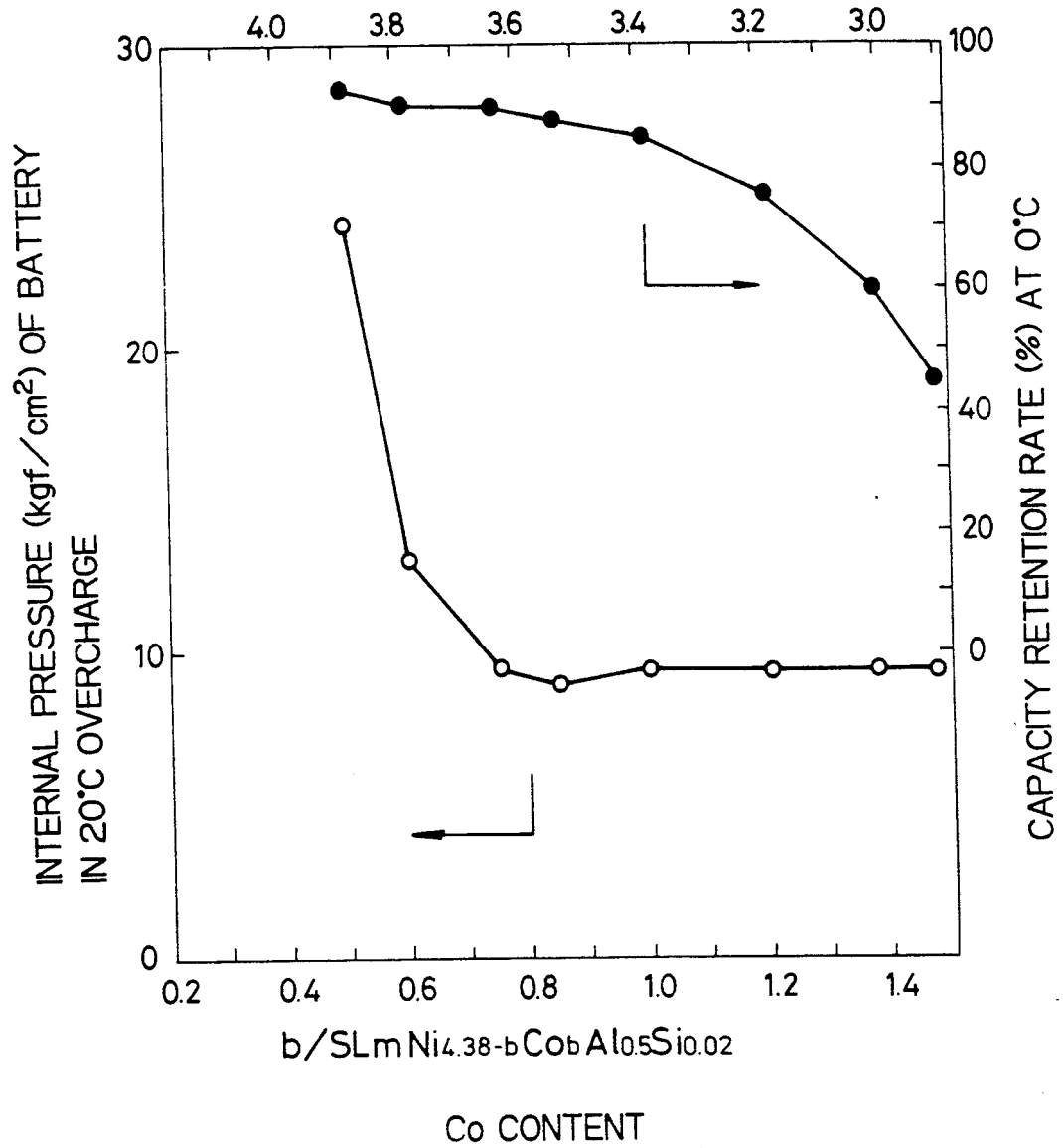
FIG. 4 is a graph representing the relationship between the Co content and the Ni content contained in the hydrogen-occlusion alloy and the internal pressure of the battery during overcharging at 20° C., and the relationship between the Co content and Ni content and the capacity retention rate at 0° C.

As clear from FIG. 4, when the Ni content is in the range of $3.0 \leq a \leq 3.8$ and the Co content in the range of $0.6 \leq b < 1.4$, both based on SLm taken as 1, the capacity retention rate at 0° C. can be maintained at a desirable level of 60% or higher.

EXAMPLE 4

A commercially available misch metal including 85 wt. % La, 2 wt. % Ce, 9 wt. % Nd, and 4 wt. % of other rare earth elements served as the SLm component and was mixed together with Ni, Co, Al and Si in a predetermined compounding ratio of SLm Ni$_{3.98-c}$Co$_{1.00}$Al$_c$Si$_{0.02}$ wherein c=0.20, 0.30, 0.40, 0.50, 0.60, 0.70 and 0.80. The respective mixtures were heated and melted in a high-frequency melting furnace to manufacture the respective alloys. Then, the alloys were each annealed at 1000° C. for 10 hours. Each of these alloys was mechanically pulverized into a fine powder of 150 mesh or finer to obtain a hydrogen-occlusion alloy powder.

Figure 5:
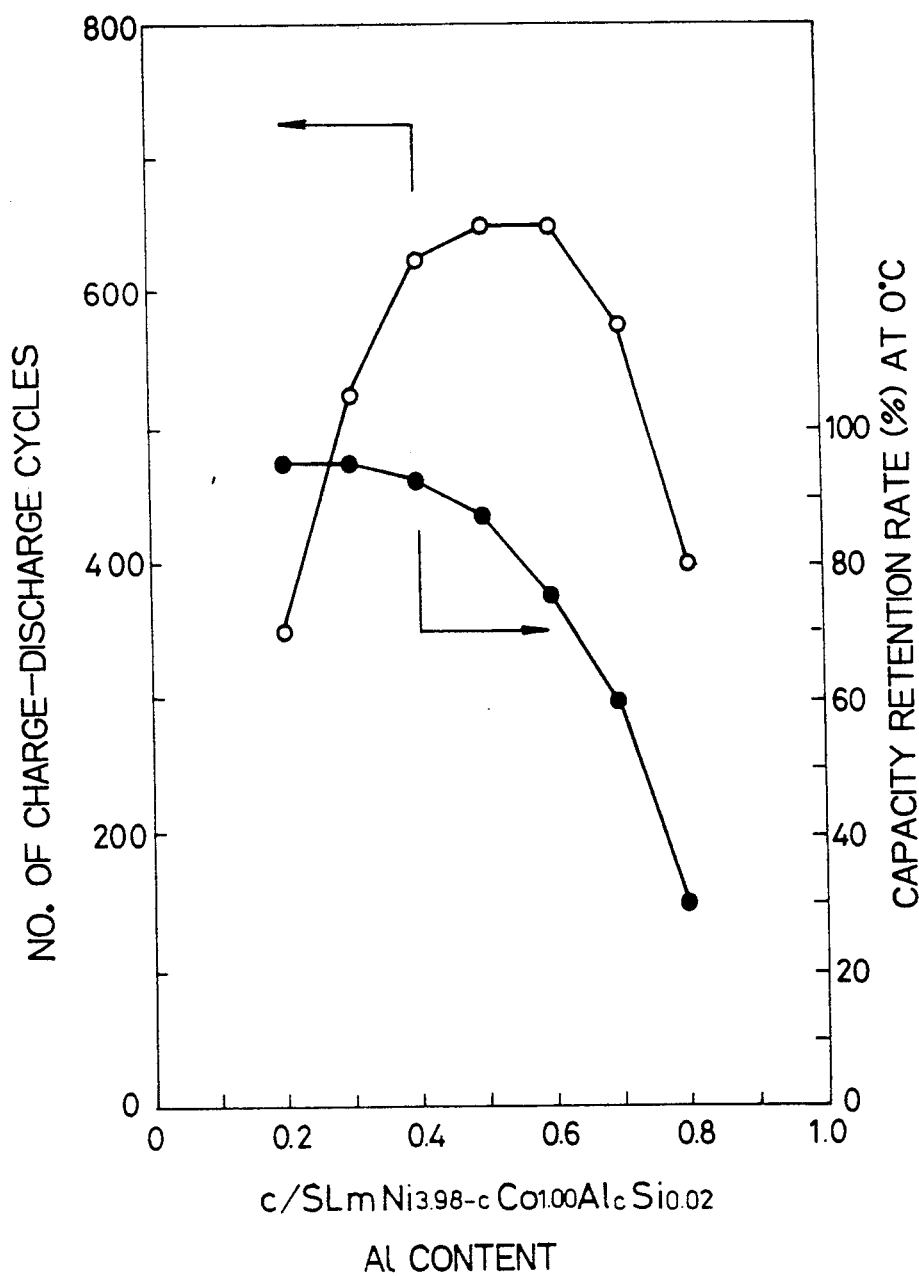
FIG. 5 is a graph representing the relationship between the Al content contained in the hydrogen-occlusion alloy and the number of charge-discharge cycles, and the relationship between the Al content and the capacity retention rate at 0° C.

Electrodes were then made using the respective hydrogen-occlusion alloys in the same manner as described in Example 1. Using these electrodes as negative electrodes, a plurality of sealed-type storage batteries were manufactured in the same manner as described in Example 1. A charge-discharge cycle life test was carried out on these batteries in the same manner as described in Example 2. The results of the cycle life tests are shown in FIG. 5. As clear from FIG. 5, when the Al content is in the range of $0.3 \leq c \leq 0.7$ as based on SLm taken as 1, a desirable battery life of 500 cycles or more was obtained.

In addition, the capacity retention rate of each test battery was tested by the 0° C. rapid discharge test in the same manner as described above in relation to Example 3. The results of the test are also shown in FIG. 5. As clear from FIG. 5, when the Al content is in the range of $0.3 \leq c \leq 0.7$ as based on SLm taken as 1, a desirable capacity retention rate of 60% or higher is obtained.

EXAMPLE 5

A commercially available Mm or misch metal including 85 wt. % La, 2 wt. % Ce, 9 wt. % Nd, and 4 wt. % of other rare earth elements served as the SLm component and was mixed with Ni, Co, Al and Si in a predetermined compounding ratio of SLm $Ni_{3.65-d}Co_{0.85}Al_{0.50}Si_d$ wherein d=0.005, 0.01, 0.02, 0.03, 0.04, 0.05, 0.06 and 0.07. It is noted that when d=0.005, such represents the Si content contained as an impurity in the commercially available Mm. The respective mixtures were heated and melted in a high-frequency melting furnace to manufacture the respective alloys. The alloys were each annealed at 1000° C. for 10 hours. Next, each of the alloys was mechanically pulverized into a fine powder of 150 mesh or finer to obtain a hydrogen-occlusion alloy powder.

Additionally, a commercially available Mm including 85 wt. % La, 2 wt. % Ce, 9 wt. % Nd and 4 wt. % of other rare earth elements served as the SLm component and was mixed with Ni, Co, Al and Ge in a predetermined compounding ratio of $SLmNi_{3.65-d}Co_{0.85}Al_{0.50}Ge_d$ wherein d=0.00, 0.05, 0.10, 0.20, 0.30, and 0.40. The respective mixtures were heated and melted in a high-frequency melting furnace to manufacture the respective alloys. Then, the alloys were each annealed at 1000° C. for 10 hours. Next, each of the alloys was mechanically pulverized into a fine powder of 150 mesh or finer to obtain a hydrogen-occlusion alloy powder.

Hydrogen-occlusion electrodes were manufactured in the same manner as described in Example 1 from the respective hydrogen-occlusion alloys. The difference between the two sets of electrodes of the present example is that the electrodes contain varied amounts of Si proportionally different from one another and the second set of electrodes contained varied amounts of Ge proportionally different from one another. A plurality of cylindrical sealed-type AA-Size 1000 mAh storage batteries were manufactured using the electrodes as described in Example 1 except none of the presently considered batteries were equipped with an internal pressure-measuring sensor device. The batteries were allowed a standing time of 5 hours and the initial charge on the batteries was discontinued when the charged electrical quantity amounted to 20% of the rated capacity. The break time in charging lasted 15 hours. The procedures for resuming the initial charge and carrying out the other operations including those necessary to complete the charging of the batteries and conducting the capacity confirmation test were the same as described in Example 1.

A 40° C. rapid discharge test was carried out to determine the capacity retention rate for each battery of the batteries having differing proportions of Si and Ge content. More specifically, the batteries were each charged with 0.2 C current at 20° C. for 150% of the rated capacity and thereafter kept at 40° C. for 12 hours. Afterwards, the batteries were discharged with 1.5 C current at the same temperature until the battery voltage dropped to 1.0 V in order to measure the discharge capacity thereof. The capacity retention rate based on this 40° C. rapid discharge test was calculated by dividing the discharge capacity obtained in this test by the results obtained for the same battery through the 0.2 C discharge capacity confirmation test conducted as described above at 20° C. The capacity retention rate obtained with the 40° C. rapid discharge test should be 90% or higher to be desirable. The test results are shown in FIGS. 6 and 7.

Figure 6:
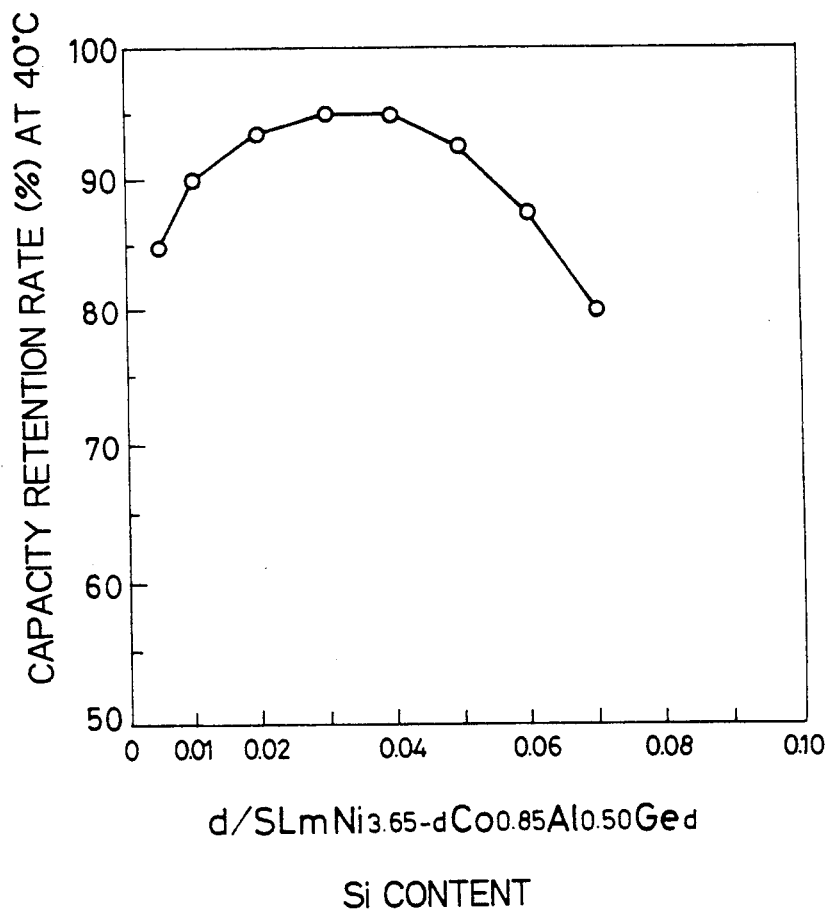
FIG. 6 is a graph representing the relationship between the Si content contained in the hydrogen-occlusion alloy and the capacity retention rate at 40° C.
Figure 7:
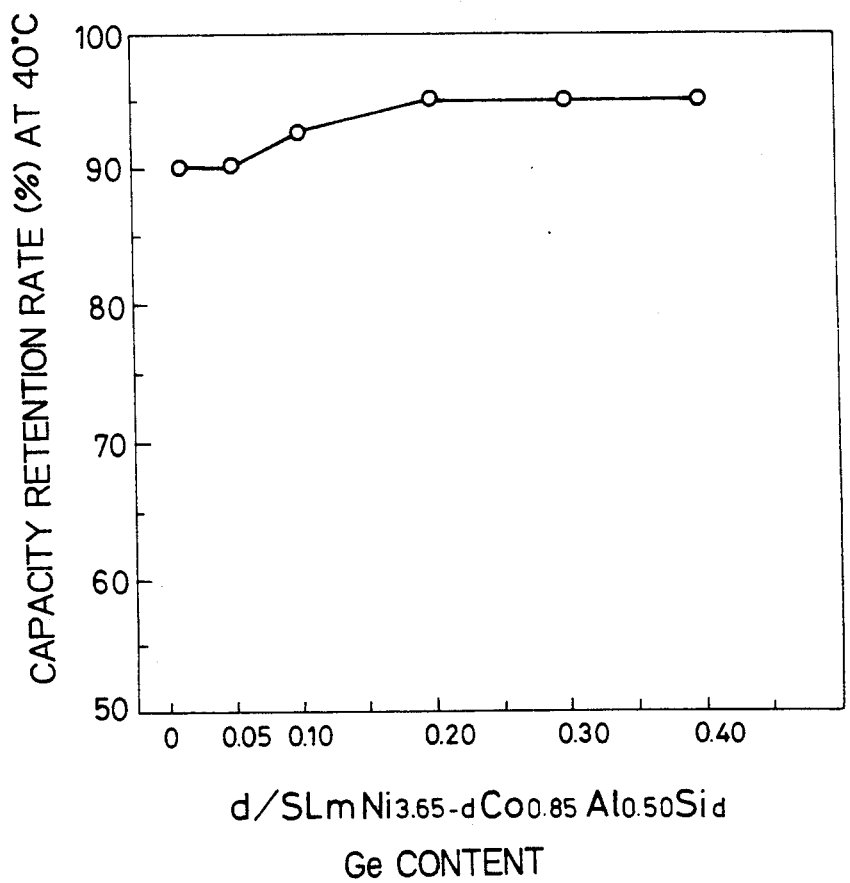
FIG. 7 is a graph representing the relationship between the Ge content contained in the hydrogen-occlusion alloy and the capacity retention rate at 40° C.

As clear from FIG. 6, when M, i.e., Si in FIG. 6, is in the range of $0.01 \leq d \leq 0.05$ based on SLm taken as 1, a desirable capacity retention rate of 90% or higher at 40° C. was maintained. Further, as clear from FIG. 7, when M, i.e., Ge in FIG. 7, is in the range of $0.01 \leq d \leq 0.3$ based on SLm taken as 1, a 90% or higher capacity retention rate as in the case of Si above was maintained. The same effect was also obtained with a mixture of Si and Ge.

Further, with the two types of batteries manufactured as described above, a cycle life test was performed in the same manner as described in Example 2. In addition, a test to measure the internal pressure of the batteries during an overcharge thereof at 20° C. was carried out on the batteries in the same manner as in Example 3. In these tests, the cycle life should be 500 cycles or more to be desirable while the internal pressure should be 20 Kgf/cm² or lower to be desirable. The results are shown in FIGS. 8 and 9.

Figure 8:
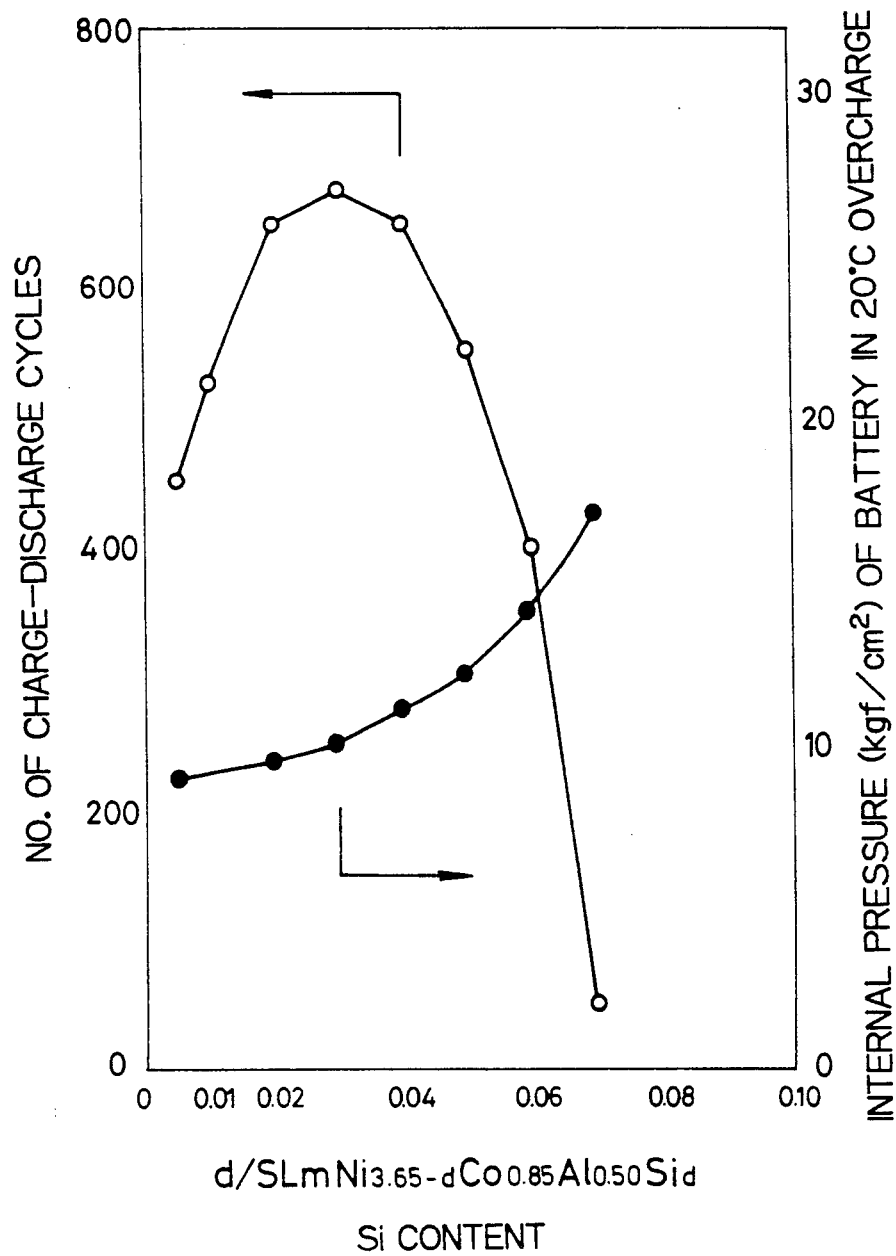
FIG. 8 is a graph representing the relationship between the Si content contained in the hydrogen-occlusion alloy and the number of charge-discharge cycles, and the relationship between the Si content and the internal pressure of the battery during overcharge at 20° C.
Figure 9:
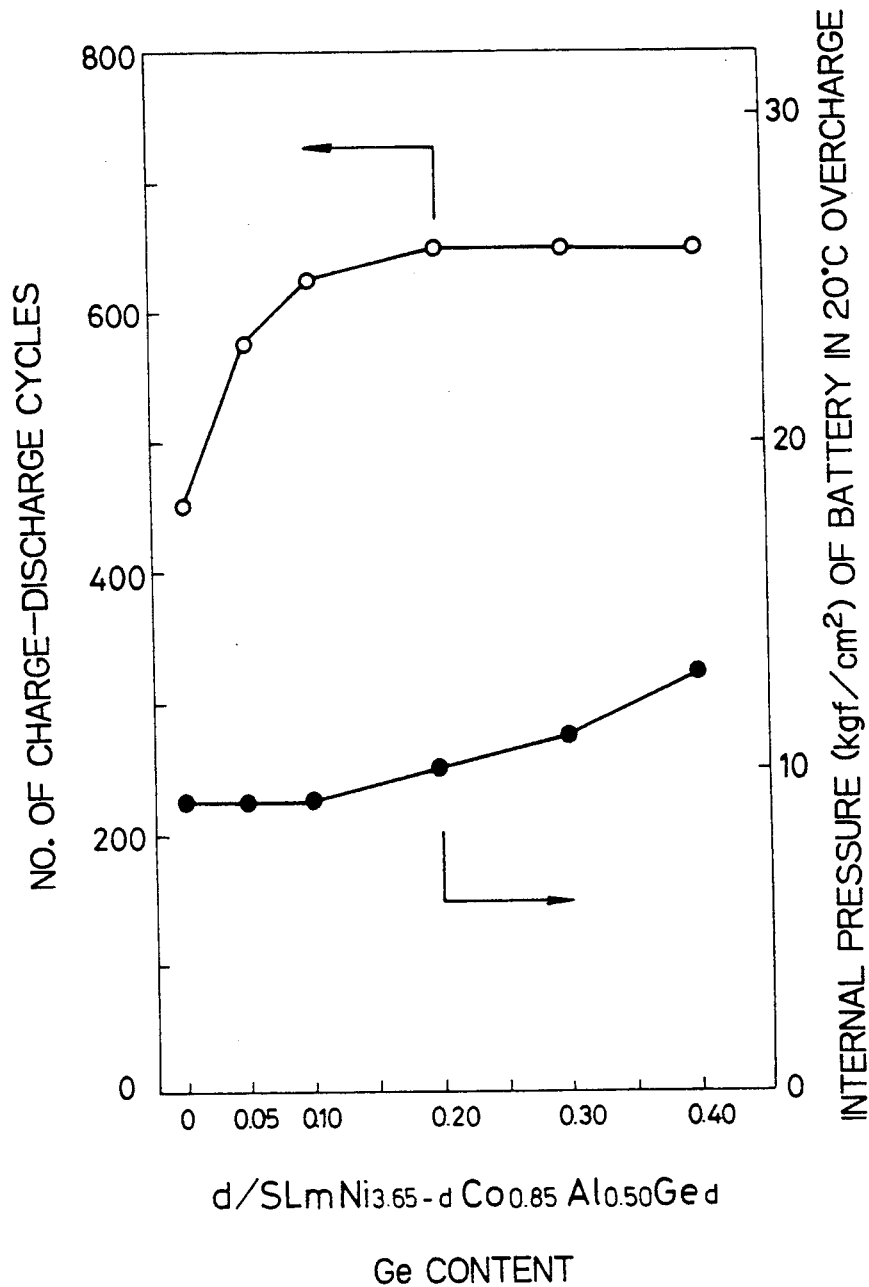
FIG. 9 is a graph representing the relationship between the Ge content contained in the hydrogen-occlusion alloy and the number of charge-discharge cycles, and the relationship between the Ge content and the internal pressure of the battery during overcharge at 20° C.

As clear from FIGS. 8 and 9, when the composition ratio of M=Si, based on SLm taken as 1, is in the range of $0.01 \leq d \leq 0.05$, and when M=Ge, based on SLm as 1, is in the range of $0.01 \leq d \leq 0.30$, the battery life in terms of charge-discharge cycles is maintained for 500 cycles or more while the internal pressure of the battery during overcharge at 20° C. is kept down to 20 Kgf/cm² or less.

EXAMPLE 6

A commercially available misch metal including 85 wt. % La, 2 wt. % Ce, 9 wt. % Nd and 4 wt. % of other rare earth elements served as the SLm component and was mixed with Ni, Co, Al and Si in a predetermined compounding ratio of $SLm\alpha Ni_{3.63}Co_{0.85}Al_{0.50}Si_{0.02}$ wherein $5/\alpha = (a+b+c+d) = 4.30$, 4.50, 4.70, 4.80, 4.90, 5.00, 5.10 and 5.20. The respective mixtures were heated and melted in a high-frequency melting furnace to manufacture the respective alloys. The alloys each were then annealed at 1000° C. for 10 hours. Finally, each of the alloys was mechanically pulverized into a fine powder of 150 mesh or finer to obtain a hydrogen-occlusion alloy powder.

Hydrogen-occlusion electrodes were manufactured using the alloy powders obtained in the same manner as described in Example 1. The electrodes together with other components were assembled to provide sealed-type storage batteries, each being given an initial charge according to the same conditions as set forth in Example 3 and being further charged in the same manner as set forth in Example 1 for completion of the charging.

A charge-discharge cycle life test was carried out on the batteries in the same manner as described in Example 2 while a 20° C. overcharge internal pressure-measuring test was carried out in the same manner as described in Example 3. The results are shown in FIG. 10.

Figure 10:
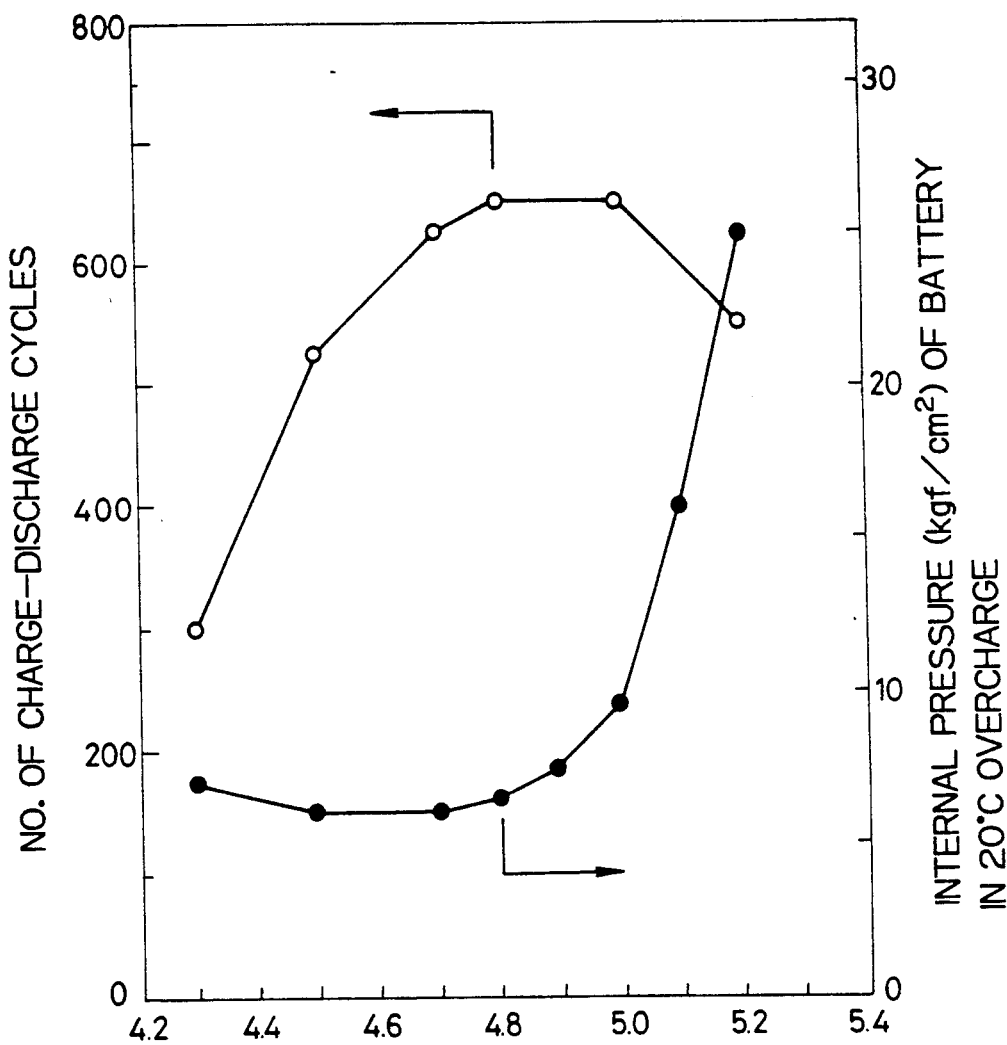
FIG. 10 is a graph representing the relationship between the compounding ratio based on SLm of the total sum of Ni, Co, Al and M and the number of charge-discharge cycles, and the relationship between the compounding ratio and the internal pressure of the battery during overcharge at 20° C.

As clear from FIG. 10, when the compounding ratio, based on SLm taken as 1, of the sum total (a+b+c+d) of Ni, Co, Al and Si is in the range of 4.5 to 5.10, there is secured a charge-discharge cycle life of 500 cycles or more while the internal pressure of the battery can be held down to 20 Kgf/cm² or lower.

Furthermore, where the Si component was substituted by Ge or a combination of Si and Ge were used, the same results as described above were obtained.

Accordingly, advantages are provided by the present invention as described when the initial charge for activation of a newly constructed sealed-type hydrogen-occlusion electrode-equipped storage battery is started, if the standing time between the electrolyte fill-up to the commencement of the initial charging is not more than 14 hours. This serves to hold down low the internal pressure of the battery after completion of the charging during an overcharge operation of the battery. Further, if the standing time is limited to within 10 hours or within 5 hours, the internal pressure can be held down even lower. In addition, when the initial charging of the battery is discontinued at a time when the battery is not completely charged, i.e., charged from 5% to less than 100% of the rated capacity of the battery, the internal pressure of the battery can be maintained low during an overcharging operation. In such instance, when the discontinuance or break time of the initial charging is one hour or more, the electrode can be uniformly impregnated with the electrolyte during the break time so that the battery is uniformly charged when the initial charging is resumed. As a result, the battery is assured of a lowered internal pressure. Furthermore, when the initial charging is discontinued at a time when the battery is charged to at least 20% of the rated capacity, the internal pressure of the battery can be held to an even lower level, which is preferred. In addition, the break time of the initial charging is preferably 5 hours or more. In particular, when the break time in the initial charging is 20 hours or more when the battery is charged less than 100% of the rated capacity thereof, the lowest internal pressure can be assured during overcharging operation.

Therefore, the method of manufacturing a sealed-type storage battery according to the present invention using a hydrogen occlusion alloy to produce an electrode results in an electrode which not only costs comparatively less then conventional electrodes, but also provides a sealed-type storage battery which provides a longer charge-discharge cycle life, assures a lower capacity loss at either a high or low temperature, and a lower internal pressure during an overcharging operation.

As will be apparent to one skilled in the art, various modifications can be made within the scope of the aforesaid description. Such modifications being within the ability of one skilled in the art form a part of the present invention and are embraced by the appended claims.

It is claimed:

1. A method of manufacturing a sealed-type storage battery comprising the steps of (1) placing a battery element including a hydrogen-occlusion negative electrode, a separator and a positive electrode, in a battery container; (2) placing an alkaline electrolyte in said battery container with said battery element; (3) sealing said battery container; (4) allowing said battery container to stand for not more than about 14 hours between the time of placing said alkaline electrolyte in said battery container and commencing charging of said battery element; (5) commencing charging of said battery element; (6) discontinuing said charging of said battery element for at least one hour when said battery element is charged at least 5% or more but less than 100% of capacity of the storage battery's rated capacity; and (7) resuming said charging of said battery element to charge said battery element completely.

2. A method of manufacturing a sealed-type storage battery as claimed in claim 1 wherein said battery container in step (4) stands not more than about 10 hours.

3. A method of manufacturing a sealed-type storage battery as claimed in claims 1 or 2 wherein said battery container in step (4) stands not more than about 5 hours.

4. A method of manufacturing a sealed-type storage battery as claimed in claim 1 wherein the discontinuing of said charging of step (6) is for a period of at least 5 hours.

5. A method of manufacturing a sealed type-storage battery as claimed in claims 1 or 4 wherein the discontinuing of said charging in step (6) is for a period of at least 20 hours.

6. A method of manufacturing a sealed-type storage battery as claimed in claim 1 wherein the discontinuing of said charging in step (6) occurs when the battery element has been charged to at least 20% capacity of the storage battery's rated capacity.

7. A method of manufacturing a sealed-type storage battery as claimed in claim 1 wherein said hydrogen-occlusion negative electrode of said battery element is made from a hydrogen-occlusion alloy comprising $SLm \cdot Ni_a Co_b Al_c M_d$ wherein SLm is a mixture of at least 70 wt. % lanthanum, 20 wt. % or less of neodymium and at least one other rare earth element, M is at least one of silicon or germanium, and a, b, c, and d are as follows: $3.0 \leq a \leq 3.8$, $0.6 \leq b < 1.4$, $0.3 \leq c \leq 0.7$ and d is $0.01 \leq d \leq 0.05$ when M is silicon and d is $0.01 \leq d \leq 0.3$ when M is germanium.

* * * * *